No. 675,336. Patented May 28, 1901.
C. LUKE.
PIPE CONNECTION FOR VALVES, &c.
(Application filed Dec. 21, 1900.)
(No Model.)
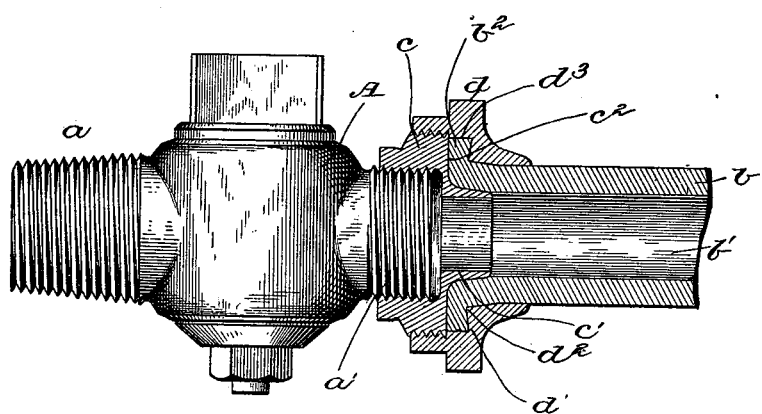
Witnesses.
Inventor,
Charles Luke,
by Crosby Gregory.
atty's.

UNITED STATES PATENT OFFICE.

CHARLES LUKE, OF MILFORD, CONNECTICUT, ASSIGNOR TO THE NEW HAVEN NOVELTY MACHINE COMPANY, OF NEW HAVEN, CONNECTICUT.

PIPE CONNECTION FOR VALVES, &c.

SPECIFICATION forming part of Letters Patent No. 675,336, dated May 28, 1901.

Application filed December 21, 1900. Serial No. 40,658. (No model.)

*To all whom it may concern:*

Be it known that I, CHARLES LUKE, a citizen of the United States, residing at Milford, county of New Haven, State of Connecticut, have invented an Improvement in Pipe Connections for Valves, &c., of which the following description, in connection with the accompanying drawings, is a specification, like letters on the drawings representing like parts.

This invention has for its object the production of an improved connection for use with lead or other soft-metal pipe and to join up said pipe with a valve or other externally-threaded casting.

The drawing shows my invention as applied to a valve of standard size, such as used, for instance, by gas and water companies to admit gas or water into a special service-pipe, the pipe coupled with the valve being of lead or equivalent soft metal.

The valve A, which I have herein chosen to show, has at one end a tapered and threaded portion $a$ to enter a tapped and threaded hole in a city or other gas or water main employed to supply gas or water to a consumer. The outlet end $a'$ of the valve is threaded, and in practice it receives upon it a running-nut, said nut surrounding loosely a sleeve which projects sufficiently to enter the interior of a lead pipe, which is joined to said sleeve by a wipe-joint, to do away with the making of which is the chief object of the invention herein to be described and claimed. The outlet end $a'$ of the valve-body is represented as threaded, and the passage for gas or water through said outlet is of an established size, and it is desired to use in connection with this outlet, that the full efficiency of the valve may be utilized, a lead pipe $b$, having its outlet-passage $b'$ of substantially the size of the opening in the outlet. To enable the lead pipe to be secured to this valve or other externally-threaded member, I flange the end of the pipe, as at $b^2$. I further provide a nut $c$, threaded internally and externally, said nut having at one end a face $c^2$ and a neck $c'$, which for the best results is tapered externally, so that when the pipe is forced onto the nut the neck will act to expand the pipe sufficiently to insure a gas and fluid tight joint. The external thread of the nut is engaged by an internal thread of a coupling member $d$, having at the inner end of its thread a smooth cylindrical surface $d^3$ and joining said surface a shoulder $d'$, having its face inclined outwardly, so that said shoulder presents an edge or corner $d^2$, which as the member $d$ is being rotated will act to enter the under side of the flange close to the body of the pipe and by pressure expand the flange $b^2$ until its edge meets, preferably substantially gas and fluid tight, the inner side of the cylindrical wall $d^3$. As the coupling member $d$ is being turned into its working position the shoulder $d'$, acting against the under side of the flange of the pipe, forces the outer side of said flange powerfully against the face of the nut, so that when said member $d$ is set up tight there is formed between the nut and the member $d$ a gas and fluid tight joint, caused by the compression of the body of the pipe between the neck and the member $d$ and between the shoulder of the member and the face of the nut and also preferably between the edge of the flange and the interior of the member $d$.

Having described my invention, what I claim, and desire to secure by Letters Patent, is—

1. An externally-threaded nut having at one end a face, combined with an internally-threaded coupling member adapted to be screwed to said nut, said coupling member having an outwardly-flaring shoulder to sustain the under side of a flange at the end of a lead pipe and to thereby expand said flange as the coupling member is screwed up and clamp the same between the shoulder of the coupling member and the face of the nut gas and fluid tight.

2. An externally-threaded nut having at one end a face, and a tapered neck extending therefrom, combined with an internally-threaded coupling member screwed to said nut and having a shoulder outwardly beveled to leave an edge to enter the under side of a flange made at the end of a piece of lead pipe and expand the same while the shoulder clamps the flange between itself and the face of the nut gas and fluid tight.

3. An externally-threaded nut having a face at one end and provided with a tapered neck, combined with an internally-threaded coupling member having a shoulder provided with an edge to enter behind and expand a flange at one end of a piece of lead pipe as the said member is screwed to the threaded nut, the said nut and coupling member when screwed together drawing the pipe upon the tapered neck and clamping the flange between the face of the nut and said shoulder of the coupling member.

4. A valve-case having its outlet threaded externally, an internally and externally threaded nut applied to the threaded end of said outlet, said nut having a face, combined with a coupling member having an internal thread, and a shoulder having an outwardly-expanding edge or corner to enter the under side of the flange of a piece of lead pipe and expand the same to form a gas and fluid tight joint between the edge of the flange and the inner cylindrical surface of the coupling member as the said member is being screwed upon said nut and to clamp the flange gas and fluid tight between the shoulder of said member and the face of said nut.

In testimony whereof I have signed my name to this specification in the presence of two subscribing witnesses.

CHARLES LUKE.

Witnesses:
HENRY G. THOMPSON,
GEORGE E. HAIGHT.